Feb. 17, 1959 — F. G. STEELE — 2,874,343
DIGITAL SERVO
Filed Aug. 25, 1953 — 3 Sheets-Sheet 1

INVENTOR:
FLOYD G. STEELE
By Herbert E. Metcalf
HIS PATENT ATTORNEY

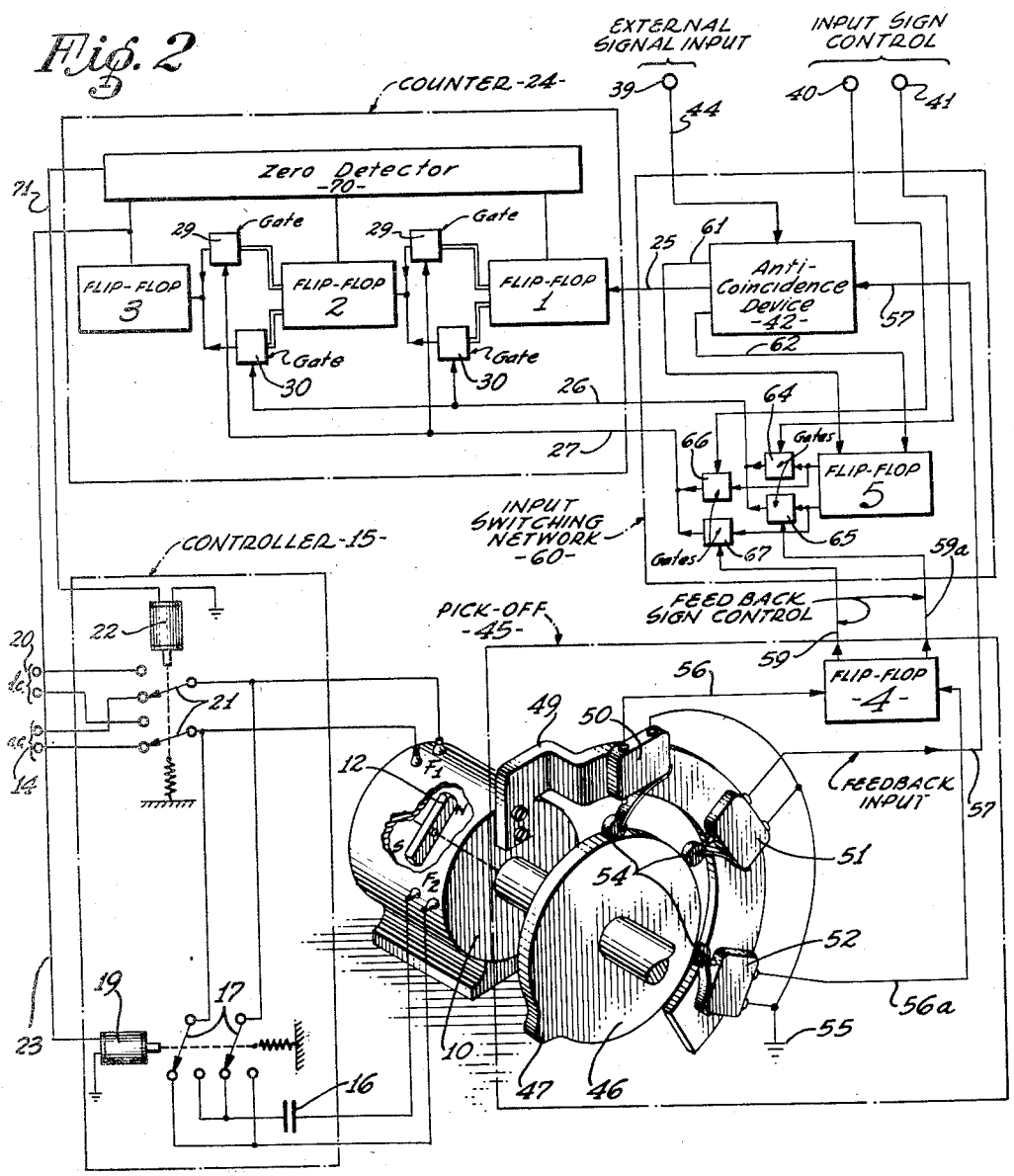

United States Patent Office 2,874,343
Patented Feb. 17, 1959

2,874,343

DIGITAL SERVO

Floyd G. Steele, La Jolla, Calif.

Application August 25, 1953, Serial No. 377,929

(Filed under Rule 47(b) and 35 U. S. C. 118)

9 Claims. (Cl. 318—28)

This invention relates to servo mechanisms and more particularly to a means of servoing the rotation or displacement of an actuator to the condition of a digital electronic computer.

It is an object of the present invention to provide a means whereby the amount of rotation of an electric motor will be controlled by a digital electronic computer.

A further object of the present invention is to provide a means whereby an incremental change in the condition of a digital electronic computer, in a positive or negative sense, quickly results in a rotation of an electric motor, in a desired direction and amount, thereby providing a servo mechanism that operates directly from a digital input source, without reliance on the values of variable magnitudes of voltage or current for the actual positioning control operation.

Briefly, the present invention comprises a two-way counter adapted to be fed by the digital input control signals which are to be transformed into shaft rotation, an actuator connected to the counter to be operated in one direction when the last stage of the counter contains a zero, and in the opposite direction when the last counter stage is in its full condition, and means driven by the actuator to produce digital feedback signals in the counter in an opposite sense to the external control signals. An input switching network ahead of the counter insures that both the input control signals and the feedback signals reach the counter properly, as intended. The feedback signals are in direct proportion to actuator displacement so that whenever the counter content is zero, the actuator is in a position corresponding to the number value of the digital control input. Actuator stopping means is preferably provided for the zero counter condition so that oscillations of the actuator about the null or servo position are removed.

My invention will be more fully understood by referring to the following detailed description and accompanying drawings of a specific apparatus embodying the invention, but the invention is not deemed to be limited to the specific features and construction disclosed herein. In the drawings:

Figure 2 is an expanded diagram of the digital servo, showing a more detailed structure of each of its components.

Figure 1:
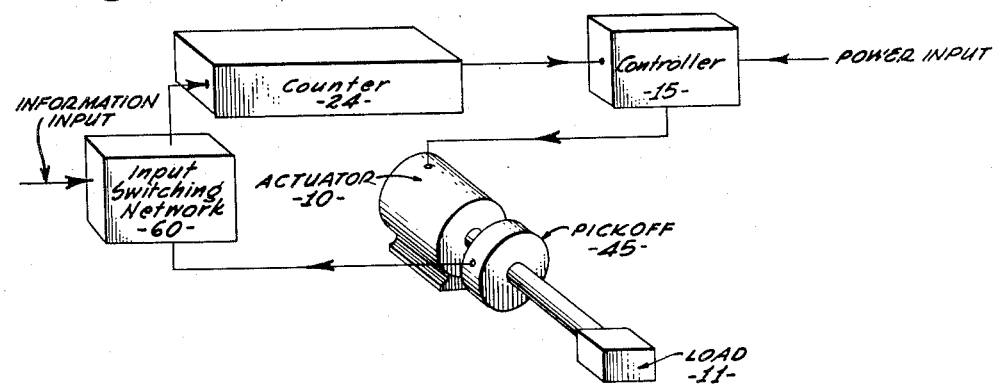
Figure 1 is a simplified block diagram showing the complete digital servo of the present invention connected to drive a load.

Referring first to Figures 1 and 2, an electric motor 10 forms an actuator to directly drive a load 11 which is to be positioned in accordance with a digital control signal. In other words, the load 11 will have a certain definite position depending upon the condition or value of a number which is the initiating control, and the load will assume new positions upon the addition or subtraction of whole digits from that number. The motor 10 is a two-phase capacitor type having a permanent magnet rotor 12, for example, and two fields F1 and F2 supplied by a single phase A. C. power source 14 through a controller 15. A capacitor 16 is in series with one of the fields, F2, as is common with this type motor. A double-pole, double-throw reversing switch 17, also located in the controller 15, is connected to reverse the power connections to the field winding F2 so that two-directional operation is provided. Reversing switch 17 is operated by a reversing relay 19 so that motor rotation is in one direction when the relay is energized, and in the other direction when relay 19 is deenergized. Control of the reversing relay 19 will be described later in this specification.

A D. C. power source 20 is also provided, and D. C. may be substituted for A. C. to the motor 10 by operation of a double-pole, double-throw cut-off switch 21 when a cut-off relay 22 is energized. The A. C. supply is reconnected when the cut-off relay 22 is deenergized. When D. C. is connected to the motor, a stationary magnetic field is built up in motor field F1, which provides a braking action and stops the rotor 12 at one position, only, of its 360° of rotation. Control of the cut-off relay 22 will also be described hereinafter.

The reversing relay 19 is governed by the potential on a flip-flop lead 23 which reflects the condition of the most significant stage (flip-flop 3) of a multistage, electronic binary counter 24, consisting of three stages, for example. Each stage comprises a bi-stable trigger circuit known as a "flip-flop," made up of a pair of alternately conducting electron tubes, together with the necessary interconnections and carry-over means. When flip-flop 3 is in a "zero" condition, the reversing relay 19 is caused to connect the leads of motor 10 to operate in one direction (assuming A. C. power connection), and when flip-flop 3 is in a "one" condition, the motor is connected to operate in the opposite direction. This is accomplished by wiring the reversing relay 19 to the anode of one tube in the trigger circuit, as will be apparent to those skilled in the art.

Figure 3:
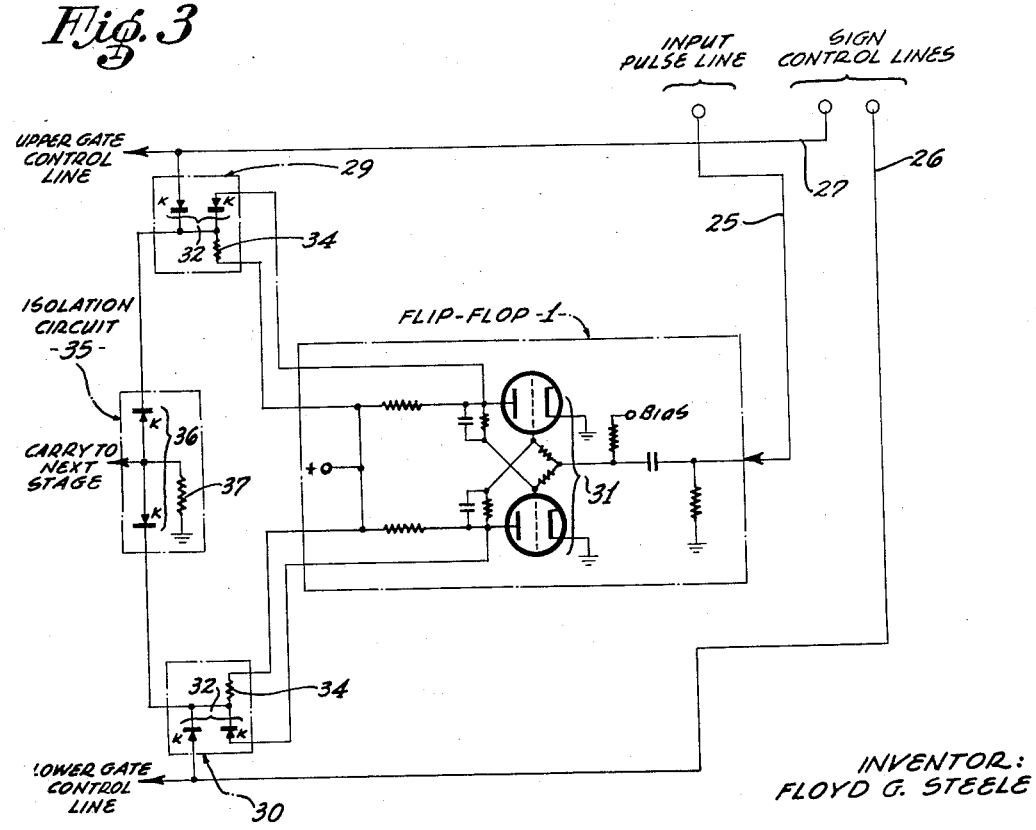
Figure 3 is a schematic diagram showing exemplary details of the first stage of the counter in Figure 2.

The counter 24 is designed for a single control input, as shown in Figures 2 and 3. Incoming pulses on an input line 25 are added or subtracted in accordance with the potentials of two sign control lines 26 and 27. When one line 26 or 27 is at a relatively high potential and the other low, a pulse on input line 25 will be added, for example, and when the polarity of lines 26 and 27 is reversed, the next incoming pulse will be subtracted. The sign control lines 26 and 27 each supply their respective potentials to upper gates 29 and lower gates 30, one of each connected between each stage of the counter 24. The counter may appear as in Figure 3 (showing one stage and one pair of gates only), where the input pulses on input line 25 are fed to the grids of both of a pair of trigger circuit tubes 31 simultaneously. This two-way binary counter 24 is shown, described, and claimed in my copending application Serial No. 152,041, filed March 27, 1950, now Patent No. 2,735,005. The gates 29 and 30 in this illustrated embodiment are composed of a pair of crystal diodes 32 and have two signal inputs and one output, plus a load resistance 34 to a positive D. C. supply voltage. In order to have an output signal carry from a gate to the next following stage, both inputs of the gate must be a relatively high potential. Other types of gating means may be used if desired. Since crystal diode gates are used, an isolation circuit 35 should be incorporated in the gate output lines before they unite at the input to the following stage. This circuit comprises a pair of additional diodes 36 connected cathode-to-cathode, and a resistor 37 to ground, and will prevent undesired coupling interaction between opposite sides of the associated flip-flop.

External control signals in pulse form to this digital servo are communicated via an external input terminal 39, the sign of the pulse being determined by whichever of two external sign terminals 40 or 41 is carrying a relatively high potential. Input pulses from input terminal 39 are fed to an anti-coincidence device 42, to be explained later, along a first input channel 44.

A pick-off device 45, generally indicated in Figure 1 and shown in detail in a box of Figure 2, is designed to detect the direction of rotation of motor 10 and furnish an electrical feedback pulse for each revolution of the motor rotor 12. Depending on the direction of rotation, this feedback pulse if fed into the counter 24 in either an additive or subtractive sense, as follows.

Attached to rotate directly with the rotor 12 is a cam disc 46 having one actuating lobe 47 on its periphery. A bracket 49 attached firmly to the housing of the motor 10 mounts three normally-open single-pole feedback switches 50, 51 and 52. Each latter switch has a spring-loaded roller actuator 54 positioned around the cam disc 46 in relation to be displaced by the cam lobe 47 to momentarily close its associated switch. One side of each feedback switch is connected to a common ground 55. The first feedback switch 50 has a control lead 56 leading to one input of a double-input feedback flip-flop 4. The output side of the second feedback switch 51 connects to a second input channel 57 of the anti-coincidence device 42, and this second input channel provides the proper feedback pulses. The third feedback switch 52 has a control lead 56a leading to the remaining input of feedback flip-flop 4.

Figure 4:
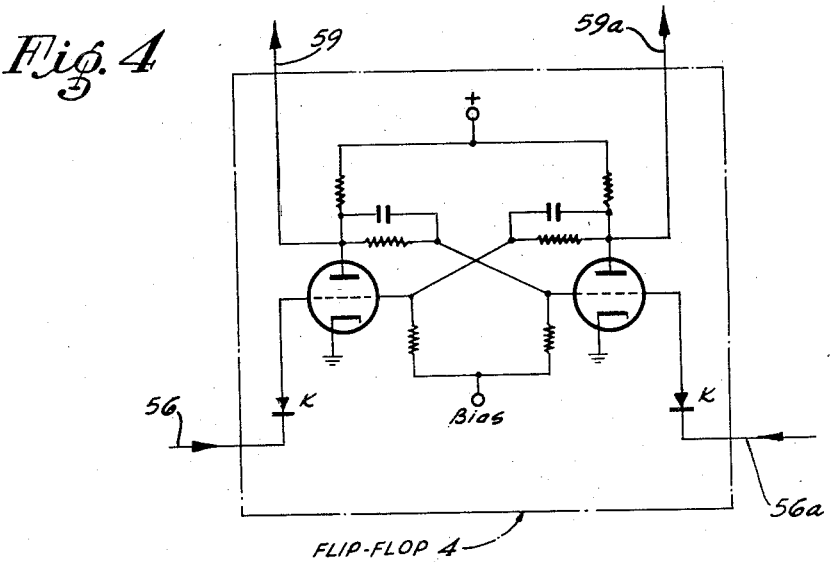
Figure 4 is a schematic diagram showing exemplary details of a part of the pick-off device shown in Figure 2.

The feedback flip-flop 4 is illustrated, for example, in Figure 4. This is merely a modification of the circuit shown in Figure 3, to provide two separate input lines to the respective grids of the trigger tubes. Whereas each pulse appearing on input line 25 to the counter 24 will trigger the first flip-flop 1 to its other stable state, pulses must be applied alternately on control leads 56 and 56a in order to continually trigger the feedback flip-flop 4. In other words, a pulse on control lead 56, for example, is capable of triggering flip-flop 4 to only one of its two stable states, if not already existing in that state, and further immediately successive pulses on control lead 56 have no effect on the flip-flop. This type of flip-flop input is well known in the art, and is also described in the above-referred-to copending application for patent.

Feedback sign wires 59 and 59a lead from opposite sides of flip-flop 4 to an input switching network 60 containing the anti-coincidence device 42. This device is for the purpose of preventing essentially simultaneous application of an externally introduced signal pulse and a feedback pulse on the input line 25 to the counter 24, since the external input may be of a random nature and coincidence of external signal pulses with feedback pulses would result in loss of one or the other, improper sign thereof, or other malfunction of the servo.

Figure 5:
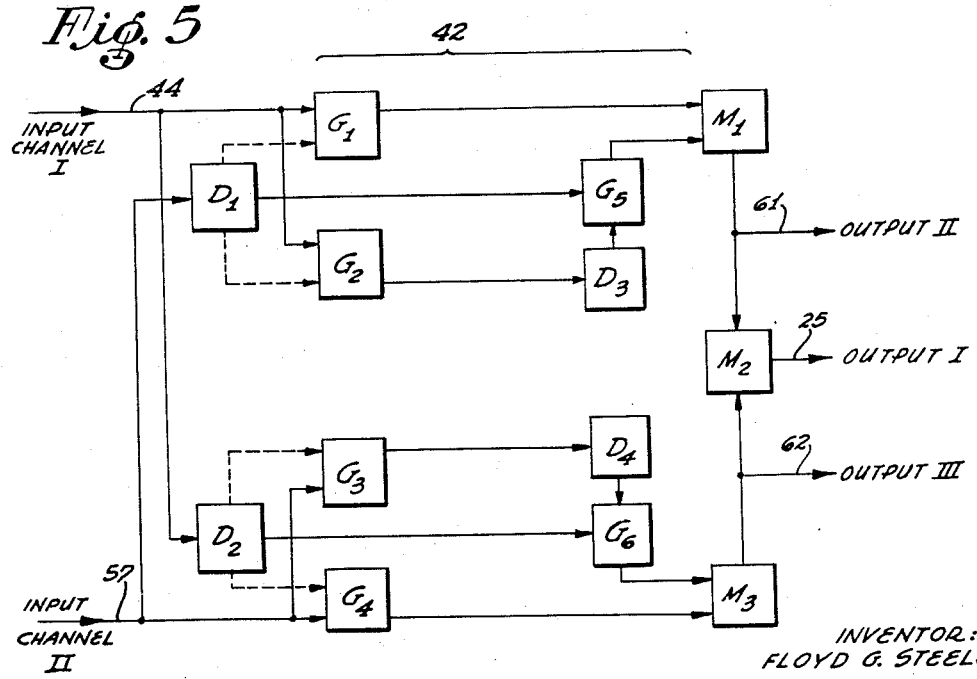
Figure 5 is a block diagram of a suitable anti-coincidence device as shown in Figure 2.

The anti-coincidence device 42 may be as shown in Figure 5, and it operates to delay one of two input pulses applied substantially simultaneously to its respective inputs. In Figure 5, the two input channels 44 and 57 lead into a system of circuit components designated G1–G6, D1–D4, and M1–M3. Components D1–D4 are mono-stable devices which trigger in one direction as the response to an input pulse and, after a short time delay, return to their stable position; these components D1–D4 are widely known in the art as "one-shot" multivibrators. Components G1–G6 are also mono-stable devices of the same general nature as the one-shot multivibrators with the exception that G1–G6 each have two input channels and can be used as gate devices, wherein one pulse may permit or inhibit the passage of an immediately following pulse. Components M1–M3 are mixing devices which take two inputs and transmit them in character along a single output channel.

The operation of the anti-coincidence device 42 is as follows: Gates G1 and G4 are normally open, and gates G2 and G3 are normally closed. Each time an input pulse occurs in the first input channel 44, for example, one-shot multivibrator D2 is triggered, and the output pulse of D2 in turn opens gate G3 and closes gate G4, both of said gates being opened and closed respectively for the duration of said output pulse. If no pulse occurs in second input channel 57 during the duration in time of said output from one-shot multivibrator D2, nothing else occurs and the input on the first input channel 44 is transmitted via gate G1 and mixers M1 and M2 to a first output channel which is the counter input line 25. If a pulse does appear on the second input channel 57 during the duration of said output pulse from D2, it passes through gate G3 and triggers one-shot multivibration D4. The output pulse from D4 in turn opens gate G6 for a given duration of time, said duration of time being equal to the duration in time of the output pulse from D2 and sufficient to permit the passage of the pulse which is produced from the trailing edge of the output pulse from D2. The trailing edge output pulse from D2, after passing through gate G6, is sent to the counter input line 25 via mixers M3 and M2.

The net effect of this process is to produce two output pulses on counter input line 25, said output pulses having a separation in time equal to the duration in time of the output pulse from multivibrator D2. Since the circuit is symmetrical, as shown in Figure 5, a pulse arriving in the first input channel 44 which closely follows a pulse in the second input channel 57 will also be delayed a duration in time equal to the duration in time of the output pulse from one-shot multivibrator D1. Therefore, if a control pulse from external input terminal 39 coincides substantially with a feedback pulse from the second feedback switch 51, these two pulses will be separated adequately before appearing on counter input line 25.

Correct sign control for each pulse on counter input line 25 is provided as follows. It is readily seen that the outputs of mixers M1 and M3 may be utilized before entering mixer M2. Thus, a second output channel 61 and a third output channel 62 (Figures 2 and 5), will carry the pulse signal information originating in input channels 44 and 57, respectively. Therefore, an input pulse in the first input channel 44 will result in an output pulse in counter input line 25 and the second output channel 61 simultaneously. Likewise, an input pulse in the second input channel 57 will result in an output pulse in counter input line 25 and the third output channel 62 simultaneously. In no case will a pulse appear on both output channels 61 and 62 simultaneously.

Second and third output channels 61 and 62 are connected to the two inputs of a double-input sign control flip-flop 5, similar in every respect to flip-flop 4 previously described. The two opposite output sides of this flip-flop 5 control four sign gates 64, 65, 66, and 67 (as shown in Figure 2) whose combined action operates as a double-pole, double-throw electronic switch. Sign gates 64–67 can be identical to the upper gates 29 and lower gates 30 of the counter 24. The action is such that the counter sign controls lines 26 and 27 are effectively connected to the external sign terminals 40 and 41, respectively, when an output pulse from the anti-coincidence device 42 appears on the second output channel 61, and such that said sign control lines 26 and 27 are effectively connected to the feedback sign wires 59 and 59a, respectively, when an output pulse appears on the third output channel 62. Therefore, the proper sign of input pulse, whether from the external input or from the feedback input, is always transmitted to the counter 24, whether or not that particular input pulse was delayed in the anti-coincidence device 42.

At the junctions of outputs from the pairs of sign gates 64, 65, and 66, 67, in Figure 2, an isolation circuit 35 should be incorporated, as described previously for the input circuit of flip-flops 2 and 3. If electron tube gates are employed, for instance, instead of the crystal diodes 32, these isolation circuits will probably not be required.

In operation of this digital servo, assume that the cut-off relay 22 is deenergized (thereby connecting A. C. to the motor circuit) and that flip-flop 3 reads "zero." The reversing switch 17 is in one of its two positions to cause rotation of motor 10 in a predetermined direction. As the motor rotates, a pulse from second feedback switch 51 enters the anti-coincidence device 42 along the second input channel 57, the sign of this pulse being subtractive, since this can be realized by the proper set-up of the first and third feedback switches 50 and 52 cooperation with said predetermined direction of motor rotation. The feedback pulse on second input channel 57 next appears on the third output channel 62 and the counter input line 25 simultaneously, after having passed through the anti-coincidence device 42 as described previously. The pulse on third output channel 62 is applied to flip-flop 5 to insure that sign gates 64 and 66 will be closed, and sign gates 65 and 67 will be open to allow transmission of the subtractive sign from feedback sign wires 59a and 59 to sign control lines 26 and 27 of the counter 24. At this same time, the pulse on counter input line 25 (from mixer M2) is applied to the first stage of the counter 24 and the content of the counter is thereby reduced by one. As long as the motor 10 is rotating thus, one digit will be subtracted from the counter content for each revolution of the cam disc 46, assuming no external input from external input terminal 39.

In this fashion, when the total counter content reaches zero, the next subtractive pulse applied thereto will fill all the stages with the digit "one." Since flip-flop 3 now reads "one," reversing relay 19 is therefore changed to actuate reversing switch 17 to its opposite position and thus apply torque to change the direction of motor rotation.

When the motor 10 begins rotating in the opposite direction, a feedback pulse in an additive sense will be applied to the counter 24 since now the feedback sign wires 59 and 59a have reversed their polarity due to the reversed sequence of operation of the feedback switches 50, 51 and 52. At the time a digit is added to the counter in the full condition (all "ones"), all stages will be cleared to "zero."

Thus, a damped oscillation of the motor 10 and the number content of counter 24 will develop, whose time of decay to a final condition is determined by the field strength and by the friction of rotation. Eventually these oscillations about the "zero-one" condition of flip-flop 3 will be reduced to simple oscillation of the motor 10 that will cause the counter to oscillate from a filled to a zero condition. This is without considering the action of the cut-off relay 22.

Attached to each stage of the counter 24 is a zero detector 70 which receives an indication of the number content of each stage. When all stages of counter 24 read "zero," a voltage is present on a detector output lead 71 which is operatively connected through the cut-off relay 22 to actuate the same and change cut-off switch 21 to D. C. operation. At all times when counter 24 is not exactly at zero, the voltage on detector output lead 71 falls below the value necessary to energize cut-off relay 22 and cut-off switch 21 is therefore returned to provide normal A. C. operation of the motor. One embodiment of such a zero detector 70 is shown, described and claimed in the copending application of Sprague and Eckdahl, Serial No. 66,254, filed December 20, 1948, now Patent No. 2,621,854. Using such a device, it is readily seen that oscillations about the "zero" position are quickly eliminated and the motor 10 will come to rest at a null position corresponding to the zero condition of the counter. It is evident that other braking means can be used as desired, rather than the D. C. field attraction described herein.

When any externally applied information is fed to the digital servo via external input terminal 39 and external sign terminals 40 and 41, it is thus seen that the motor 10 will be energized to drive the load 11 to a definite position corresponding to the number and sign of input pulses. A plurality of lobes 47 or sets of feedback switches may be attached to operate from the cam disc 46 in order to increase the precision of servoing. However, one complete sequence of three pulses must be ended before the next sequence of three starts. The motor 10 may be geared up from the load 11. If the motor is geared up 54,000 times from the load, for example, with one actuating lobe as shown, each pulse will move the load through 24 seconds of arc.

For any particular embodiment of the present invention, counter 24 must have a high enough capacity so as not to be overrun by the external input by an amount exceeding one-half the total capacity of the counter before the feedback pulses become effective at the counter input. Also, the feedback pulse frequency should obviously be higher than the average expected input pulse frequency. However, since the motor 10 runs at full speed in one direction or the other, a minimum time delay is experienced between the change in number content of the counter 24 and the accompanying change in rotation of the motor toward its new null position.

It has thereby been shown that the present invention accurately servos the rotations of an electric motor to the number content of a digital computer or other type of digital external control. Although an electric motor is the preferred type of actuator, any other suitable means may be employed in its place, to achieve a displacement of a load in other than a rotary type of motion if desired. Further, the counter 24 of this invention need not be restricted to a binary counter.

This digital servo controls the positioning of the load strictly on a digital basis, not depending on continuously variable voltages proportional to the desired load position, nor does it require any synchronizing means such as fixed frequency pulse generators and the like.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. Means for servoing the position of an actuator in accordance with a whole number of electrical input pulses, which comprises a two-way electronic counter, means for feeding input control pulses into said counter, an actuator having connections for a power supply therefor and adapted to drive a load, means for reversing the polarity of at least a portion of said power supply connections to provide for motion of said actuator in either direction, operating connections between said reversing means and the most significant stage of said counter to reverse said actuator when said most significant stage changes from an empty condition to a full condition and from full to empty, means driven by said actuator to produce digital feedback pulses in direct proportion to amount of motion of said actuator, means for feeding said feedback pulses into said counter in an opposite sense from said input pulses, whereby said load is always driven to a position dependent upon the number and sign of said input pulses, detector means for detecting a predetermined state of said counter, and braking means connected to said actuator for braking said actuator when said counter reaches said predetermined state.

2. Apparatus in accordance with claim 1 wherein said actuator is a reversible A. C. motor.

3. A digital servo comprising an electronic add-subtract binary counter, means for feeding digital input control pulses into said counter, a reversible electric motor and a power supply connected thereto, said motor adapted to drive a load to be positioned in accordance with said input control pulses, means for reversing the polarity of at least a portion of said power supply to produce rotation of said motor in either direction, operating connections between said reversing means and a stage of said counter to reverse said motor when said stage changes from an empty condition to a full condition and from full to empty, means driven by said motor to produce digital feedback control pulses in direct proportion to amount and direction of motor rotation, means for feeding said feedback control pulses into said counter in an opposite sense from said input pulses, whereby said motor drives said load toward a null position where said counter contains zero, thus arriving at a position directly dependent upon the number and sign of said input control pulses, and means for braking said motor when said load reaches said null position.

4. Apparatus in accordance with claim 3 wherein zero detecting means is connected to said counter to produce a signal indication whenever the total content of said counter is zero, an interrupting switch between said power supply and said motor, and a switch-actuating connection between said zero detecting means and said interrupting switch to disconnect said power supply from said motor at said zero condition, only, of said counter.

5. Means for servoing the position of an actuator under control of electrical pulses comprising a counter for registering signed numerical values; means for applying signed input pulses to said counter to be registered in a particular manner, an actuator, power reversing means connected to said actuator and adapted to be connected to a source of power to supply said actuator with power of different polarities to render said actuator capable of revolving in different directions, means connecting said power reversing means to said counter means to control the polarity of power applied to said actuator in accordance with the content of a particular stage of said counter, pulse generator means driven by said actuator to produce signed feedback pulses proportional in number to the motion of said actuator, means for applying said feedback pulses to said counter to be registered in a manner opposite to the particular manner in which said input pulses are registered, means for detecting when a predetermined value is registered in said counter, and means for braking said actuator when said predetermined value is registered in said counter.

6. A device according to claim 5 wherein said actuator comprising a reversible alternating-current motor.

7. A device according to claim 6 wherein said braking means comprises means for applying a direct-current voltage to said motor to brake said motor.

8. A device according to claim 5 wherein said particular stage of said counter comprises a stage of said counter utilized for registering the most significant digit of a value.

9. A device according to claim 8 wherein said predetermined value to be registered in said counter comprises a zero value.

References Cited in the file of this patent

UNITED STATES PATENTS

| | | |
|---|---|---|
| 2,489,689 | Wald | Nov. 29, 1949 |
| 2,537,427 | Seid et al. | Jan. 9, 1951 |
| 2,586,095 | Rotors | Feb. 19, 1952 |